(12) United States Patent  
Mitchell et al.

(10) Patent No.: US 7,896,609 B2  
(45) Date of Patent: Mar. 1, 2011

(54) VERTICAL AXIS WIND TURBINE SYSTEM

(75) Inventors: John Sinclair Mitchell, Port Colborne (CA); George Arthur Scott, Port Colborne (CA); Michael James Detenbeck, Fort Erie (CA)

(73) Assignee: SRI VAWT, Inc., Port Colborne, Ontario (CA)

( * ) Notice: Subject to any disclaimer, the term of this patent is extended or adjusted under 35 U.S.C. 154(b) by 779 days.

(21) Appl. No.: 11/891,114

(22) Filed: Aug. 9, 2007

(65) Prior Publication Data

US 2008/0145224 A1    Jun. 19, 2008

Related U.S. Application Data

(60) Provisional application No. 60/836,526, filed on Aug. 9, 2006.

(51) Int. Cl.
*F03D 7/06* (2006.01)

(52) U.S. Cl. .... 415/4.2; 415/4.4; 416/132 B; 416/227 R; 416/227 A; 416/240; 416/243

(58) Field of Classification Search ............. 415/2.4, 415/4.4, 141, 907; 416/132 B, 135, 227 R, 416/227 A, 198 R, 243, 240; 290/44, 55

See application file for complete search history.

(56) References Cited

U.S. PATENT DOCUMENTS

| | | | | |
|---|---|---|---|---|
| 4,115,032 A | * | 9/1978 | Lange | 416/227 A |
| 4,281,965 A | * | 8/1981 | Stjernholm | 416/227 A |
| 4,525,911 A | * | 7/1985 | Sisson et al. | 29/889 |
| 5,203,672 A | * | 4/1993 | Wolf | 415/2.1 |
| 7,007,889 B2 | | 3/2006 | Charron | |

* cited by examiner

*Primary Examiner* — Ninh H Nguyen
(74) *Attorney, Agent, or Firm* — Simpson & Simpson, PLLC

(57) ABSTRACT

The present invention is a vertical wind turbine having a turbine with a plurality of blades or wind vanes. The blades are constructed and attached to the shaft of the turbine so as to allow them to twist open to present more surface area to wind currents when a threshold rotational velocity is reached. Also presented are a novel outer shell that is placed over at least part of the shaft and a novel turbine blade.

27 Claims, 11 Drawing Sheets

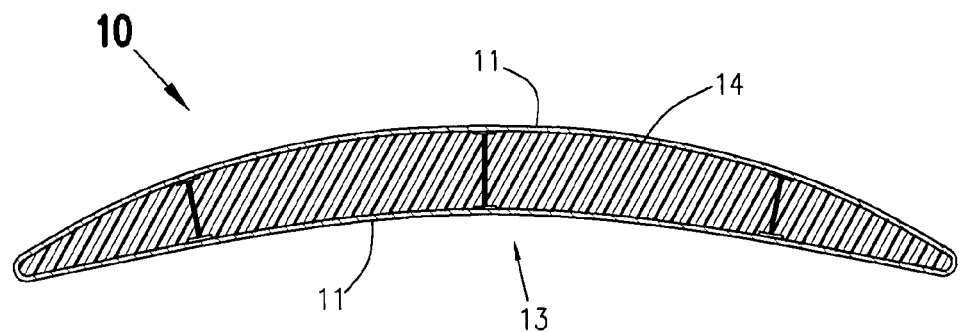
FIG. 4
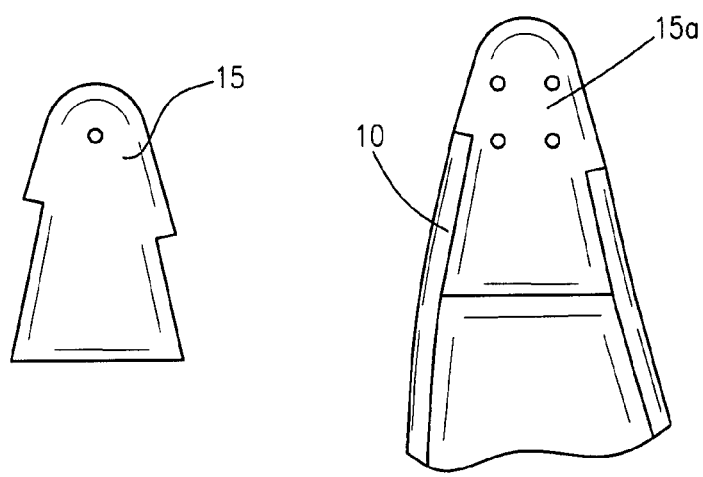
FIG. 5
FIG. 5a

VERTICAL AXIS WIND TURBINE SYSTEM

CROSS REFERENCE TO RELATED PATENT APPLICATION

This application claims the benefit under 35 U.S.C. §119 (e) of U.S. Provisional Application No. 60/836,526, filed Aug. 9, 2006.

FIELD OF INVENTION

This application is generally related to the field of energy-generating wind turbines, more specifically to vertical axis wind turbines, and still more particularly to the incorporation of novel turbine blade in a vertical axis wind turbine.

BACKGROUND OF THE INVENTION

Because of the steady depletion of easily obtainable carbon based fuels, such as petroleum and coal, there is an accelerating search for non-carbon based and renewable energy sources. One such renewable energy resource is wind power. Over centuries many types of devices designed to harness blowing wind to generate mechanical energy or, more recently, electrical energy have been developed. The famous windmills of the Netherlands and elsewhere have been and still are used for milling grain and pumping water out of low lying land areas.

Energy producing wind machines are usually called wind turbines and are broadly classified into two groups—horizontal axis wind turbines (HAWT) and vertical axis wind turbines (VAWT). Horizontal axis turbines are more prevalent and comprise a turbine that rotates around a horizontal axis. The main rotor shaft and generator are located at the top of a supporting tower and must be pointed into the wind by some means.

There are several common problems associated with HAWT machines. The more powerful horizontal axis turbines have long blades that require accurate placement out of the way of both natural and man-made obstructions and can create a safety hazard. They generate significant noise so as to cause some reluctance to have them installed near populated areas. In areas of high wind, the backward force and torque on a horizontal axis wind turbine blade peaks as it turns through the highest point of its arc. The tower hinders the air flow at its lowest point on the arc producing a local decrease in force and torque. These opposing high and low torque conditions can produce torsion on the bearings and support towers.

Vertical axis wind turbines overcome many of the problems of the HAWTs. The turbine of the VAWT spins on a vertical axis on top of the support tower thus making operation much safer for people on the ground near the tower. The VAWT is able to receive wind from any direction and therefore does not require any mechanical or computer-directed turning mechanism to keep the turbine facing in the right direction. The generator may be placed on or near the ground so the tower is not required to support the generator in addition to the turbine itself.

However, VAWTs do have drawbacks. Like HAWTs, vertical axis turbines usually have a pulsating torque that is produced during each revolution of the turbine. This occurs because of the lift and drag produced by the turbine as it spins. For each wind direction, there is a point in the revolution that produces the most lift and an opposing point that produces the most drag on the turbine. To reduce the pulsating effect, it is advantageous to achieve maximum turbine rotation as soon and efficiently as possible.

Coupled with the pulsating effect is the fact that two main types of VAWTs exist—the Savonius turbine which is a high speed, low torque turbine and the Darrieus turbine, which is a low speed, high torque turbine. Generally, the more efficient Darrieus turbine needs a starting motor or an additional Savonius rotor to start the Darrieus because the starting torque is low. The necessity of using additional starting devices reduces the efficiency of the Darrieus type of vertical wind turbine.

Thus, there exists in the field the problems of reducing the pulsating effect found in the rotation of vertical axis turbines and increasing the efficiency of vertical axis turbines.

SUMMARY OF THE INVENTION

The present invention broadly comprises a wind turbine system having a base, with the base standing in a substantially vertical orientation in relation to a foundation or the ground and having a bottom end and a top end, a rotating shaft extending from the top end of the base in a substantially vertical orientation, a lower shaft attachment means attached to the shaft, an upper shaft attachment means attached to the shaft above the lower attachment means, a turbine comprising a plurality of blades, each of the blades formed from a curved 27-2012 airfoil and having a first end fabricated from a rubber or elastomer material and attached to the upper shaft attachment means and a second end fabricated from elastomer or rubber material and attached to the lower shaft attachment means. Each of the first ends is attached to the upper shaft attachment means by a swivel connection and each of the second ends is fixedly attached to the lower shaft attachment means using a plurality of bolts. The second end is curved toward the first end to form a peak so that the length of the airfoil from the peak to the second end is less than the length of the airfoil from the peak to the first end. The angle between the peak and the second end is more acute than the angle between the peak and the first end and each of the blades twists on the swivel connection when receiving wind having a velocity above a first threshold velocity.

The present invention also includes a modified 27-2012 airfoil that includes a tapered first end having an endpiece, the end piece being flexible to allow twisting of the airfoil and a tapered second end, the tapered second end having an endpiece. The second end is curved toward the first end to form a peak so that the length of the airfoil from the peak to the second end is less than the length of the airfoil from the peak to the first end and the angle between the peak and the second end is more acute than the angle between the peak and the first end.

An object of the present invention is to provide a vertical axis turbine that operates in the Darrieus mode without using a separate starter motor or Savonius turbine.

A second object of the present invention is to present a more efficient vertical axis wind turbine that supplies an increased amount of electrical power.

A third object of the present invention is to make known a novel turbine mast that increases efficiency of the vertical axis wind turbine of the present invention.

A third object of the present invention is to make available a novel blade or airfoil for a vertical axis wind turbine.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 4 is cross section of the blade taken along line 4-4 of FIG. 2 showing the curvature of the cross section of the blade and the arrangement of the composite structure of the blade;

FIG. 5 is an enlarged view of a rubber or elastomeric endpiece for the turbine blade;

FIG. 5a is an enlarged view of the rubber or elastomeric endpiece attached to an end of the turbine blade;

DETAILED DESCRIPTION OF THE INVENTION

At the outset, it should be appreciated that like drawing numbers on different drawing views identify identical structural elements of the invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
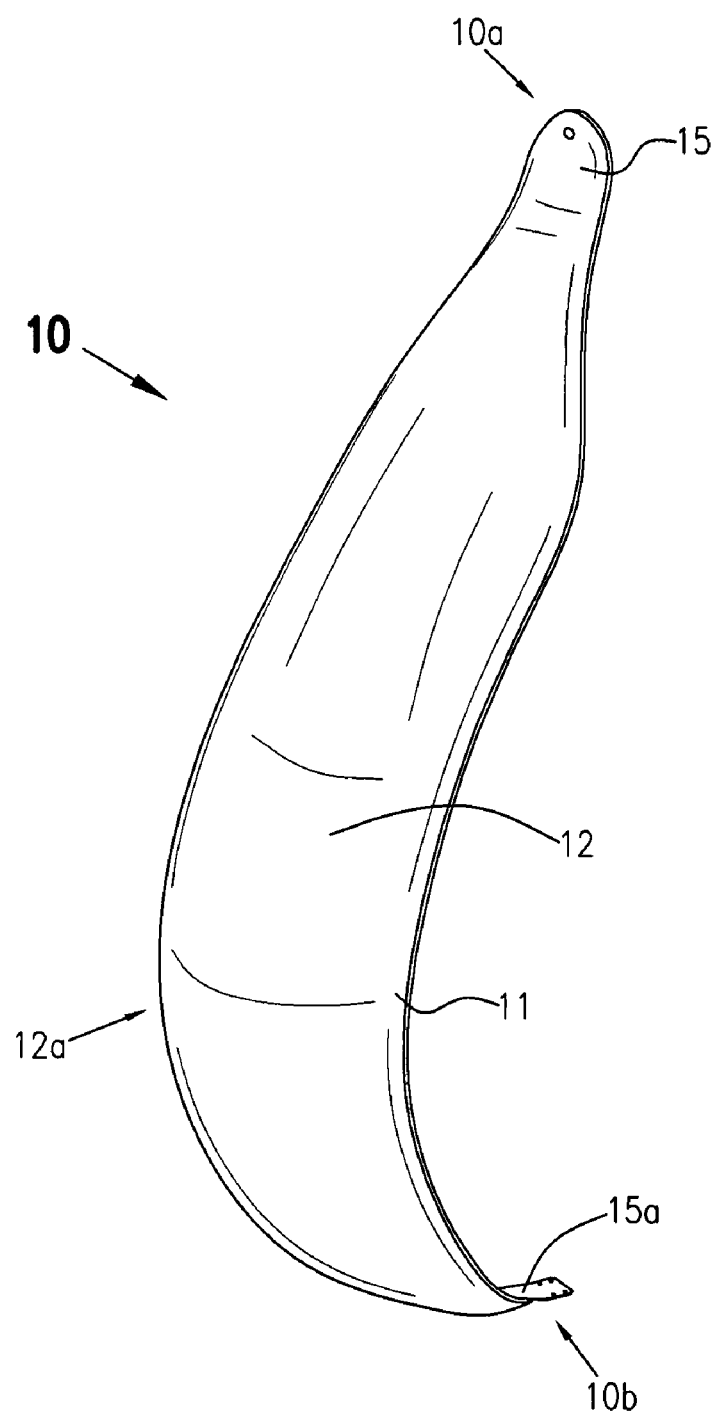
FIG. 1 is a perspective view of the outer surface of the turbine blade of the present invention.

Adverting to the drawings, FIG. 1 depicts a perspective view of the outer facing or surface of turbine blade 10 ("blade 10") of the present invention. Blade 10 is a modified 27-2012 airfoil formed into a curve with a smaller radius of curvature than the prior art 27-2012 airfoil. In one embodiment, blade 10 comprises tapered first end 10a having an endpiece 15 that is flexible to allow twisting of blade 10 and tapered second end 10b with an endpiece 15a. Endpieces 15 and 15a are curved toward each other to form a round apex or peak 12a (top of the curve) where the length of blade 10 from peak 12a to endpiece 15a is less than the length from peak 12a to endpiece 15. In addition, the angle between peak 12a and endpiece 15a is more acute than the angle between peak 12a and endpiece 15. The curve was computed using a NURBS program typical of those well known to those skilled in the art.

In one embodiment, blade 10 is fabricated as a composite with a fabric outer skin 11 and an inner core 14 of foam and fiberglass such as vinyl ester fiberglass. A typical foam may be polyurethane, although other foams may be used depending on site conditions. Outer skin 11 may be formed from KEVLAR® or carbon graphite material. One technique for forming the composite can be vacuum injection molding, a process well known to those skilled in the art. In alternate embodiments, blade 10 may be formed from metal, such as aluminum or titanium stampings, or wood. The materials used in outer skin 11 and core 14 may vary depending on the environmental conditions in which blade 10 is to be used. For example, materials used to fabricate a blade 10 to be used in windy arctic conditions would be different than materials for a blade exposed to a tropical climate with seasonal dry and rainy conditions. Typically, carbon fiber would be used for lightness and high strength but would need protection against impact. KEVLAR® may be used for flexibility of blade 10, while fiberglass may be used to produce a blade structure for moderate conditions. Outer skin 11 may also be made from fiberglass for impact resistance and sand erosion.

Figure 2:
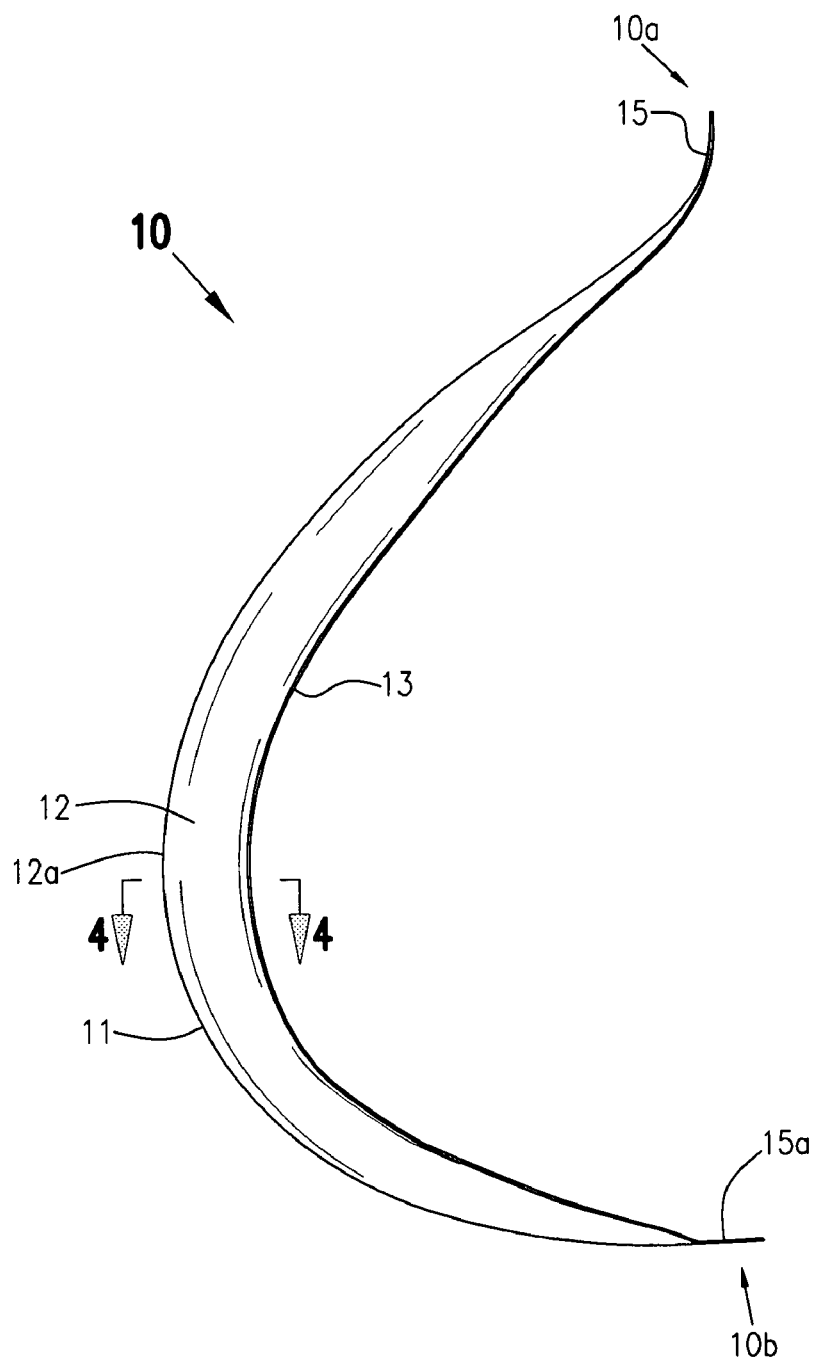
FIG. 2 is a side view of the turbine blade of the present invention showing the curve formed in the body of the blade.
Figure 3:
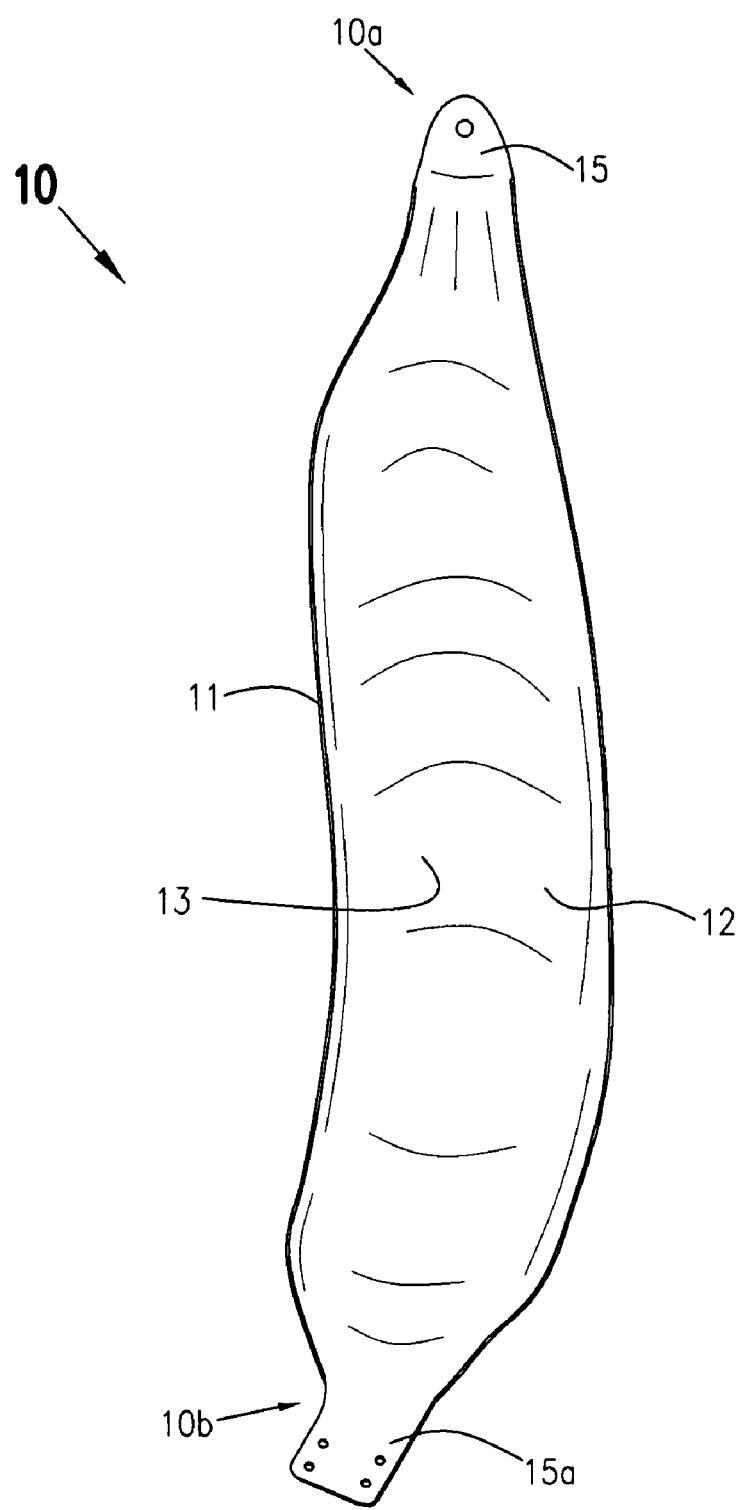
FIG. 3 is a perspective view of the inner surface of the turbine blade showing the curvature of the inner facing of the blade.

FIG. 2 is a side view of blade 10 showing the novel curve formed in the body 12 of blade 10. FIG. 3 is an inner view of blade 10 showing the curvature of the inner facing 13. As will be explained below, inner facing 13 faces the shaft of the vertical wind turbine. FIG. 4 is a cross section of blade 10 taken along line 4-4 of FIG. 2 showing the curvature of the cross section of the blade and the arrangement of the composite structure of blade 10. Outer skin 11 can be seen surrounding foam and fiberglass core 14.

FIG. 5 is an enlarged view of endpiece 15 at first end 10a of blade 10, while FIG. 5a is an enlarged view of endpiece 15a at second end 10b of blade 10. Endpiece 15 and endpiece 15a are preferably made from rubber or an elastomeric material to allow blade 10 to twist in a wind traveling above a threshold rotational velocity. In one embodiment, blade 10 can be formed into the twisted shape enabling it to present a more open surface to the air flow powering the rotation of the vertical turbine.

Figure 6:
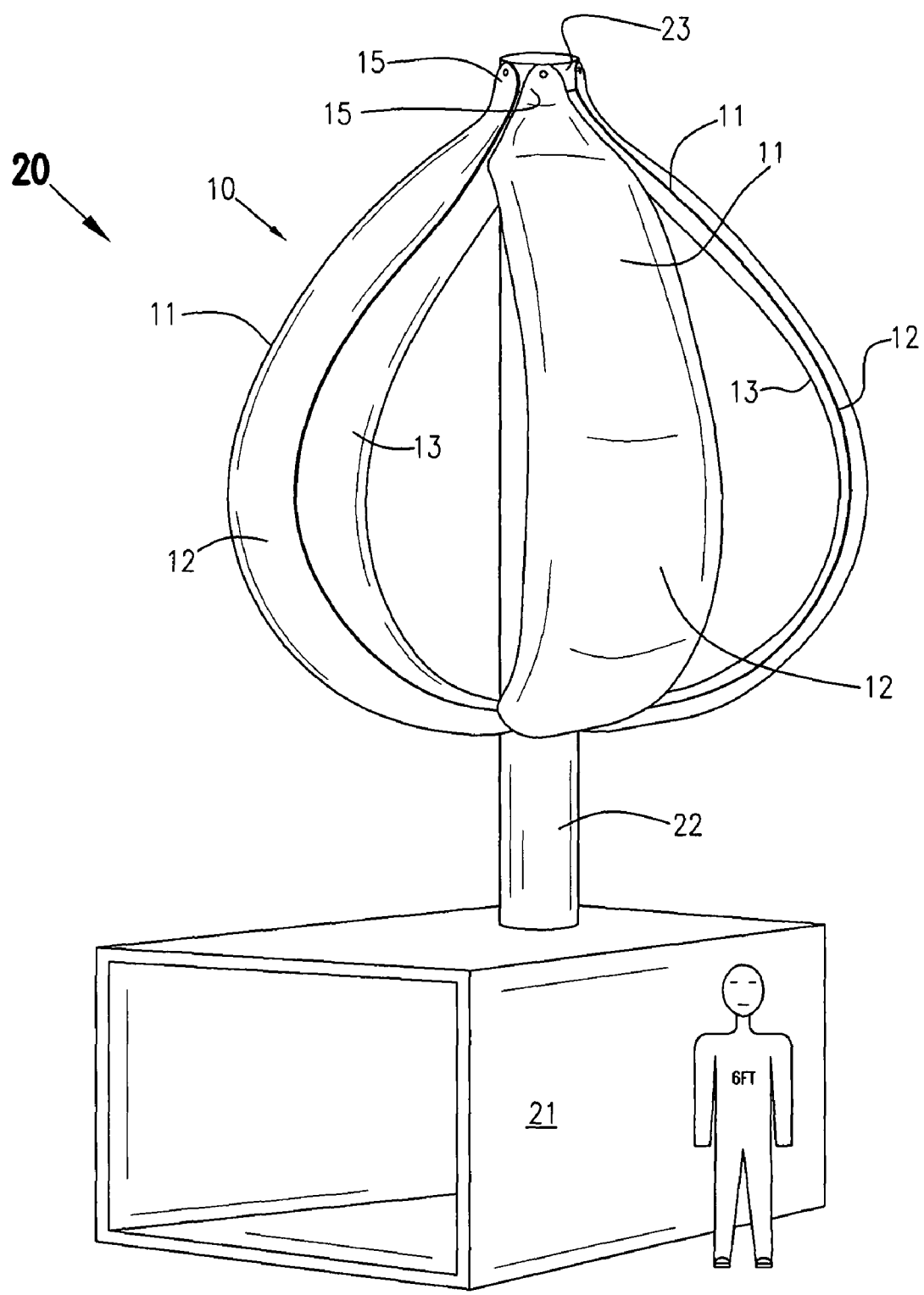
FIG. 6 is a front view of the vertical wind turbine of the present invention.

FIG. 6 is a front view of the vertical wind turbine 20 ("turbine 20") of the present invention. Base 21 supports turbine 20. In one embodiment (not shown), base 21 may be in the form of a tower extending substantially vertically from a foundation or the ground. Base 21 may hold a generator powered by turbine 20 and other components of the system, such as an inverter, controller, and other components (not seen in FIG. 6) necessary to store and transmit the power generated by turbine 20. Endpieces 15 of blades 10 are attached to an upper attachment means 23 which is attached to and rotates with shaft 22 when wind strikes one or more of blades 10. In one embodiment, upper attachment means 23 is a hub attached to shaft 22 and possess a plurality of receivers to receive and attach endpiece 15 with the receiver including a swivel connection. Similarly, endpieces 15a are attached to lower attachment means 24 which is attached to and rotates with shaft 22. Preferably, lower attachment means 24 is a hub surrounding shaft 22 and includes a plurality of receivers 24a to receive endpieces 15a with receivers 24a including a plurality of nut and bolt assemblies to hold endpiece 15a. In one embodiment, receivers 24a have four nut and bolt assemblies. FIG. 6 also shows how the novel curve in body 12 of blade 10 is incorporated into turbine 20. In a preferred embodiment, turbine 20 comprises an odd number of blades 10. An odd number of blades 10 allows for smoother rotation of turbine 20 in that a blade 10 at the point of greatest lifting force will not be directly opposed by a blade at the point of greatest drag at et same time, thus increasing the efficiency of the system. Although the discussion and figures below describe turbine 20 as possessing five blades 10, it should be recognized that, in the preferred embodiment, turbine 20 may include three, seven or other number of blades 10 accommodating the designed solidity factor which is a complex relationship recognized by persons skilled in the art between the number of blades, the chord of a blade, the aspect ratio of the blade and the Tip Speed Ratio of the turbine that comprises the blades.

Figure 7:
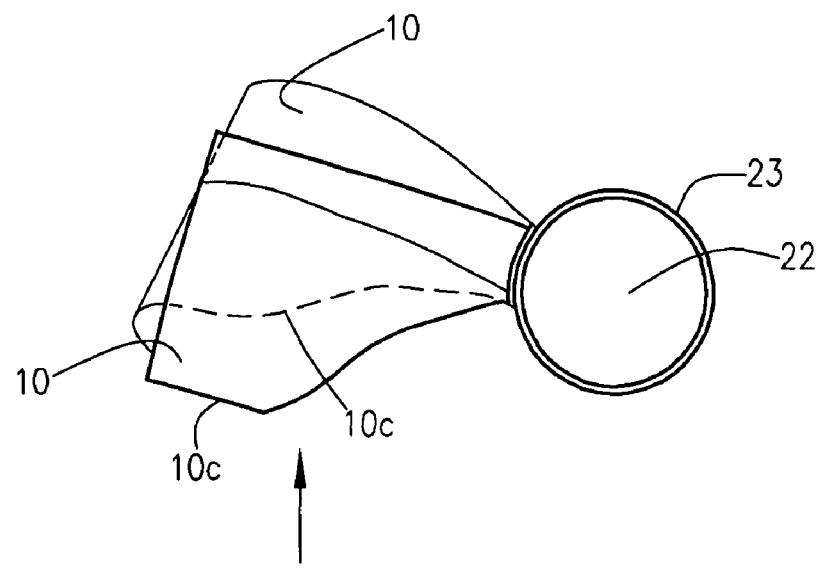
FIG. 7 is a schematic top view of one of the blades of the vertical wind turbine of the present invention showing how the blade twists to increase the blade area presented to the wind.

FIG. 7 is a schematic top view of one of blades 10 of turbine 20. Upper attachment means 23 is connected to blade 10 in a swivel connection that enables blade 10 to twist and open via centrifugal force when turbine 20 reaches a threshold rotating velocity. In FIG. 7, the bold outline of blade 10 depicts blade 10 in the closed position. The lighter outline of blade 10 shows the open position with edge 10c opened away from shaft 22 so as to receive more wind and thus turn turbine 20 faster creating the generation of more power. The arrow indicates the direction of the wind entering turbine 20. The swivel connection is a fastener with a diameter appropriate to the shear, tension, and torque for the application and held in place with a castle nut.

Figure 8:
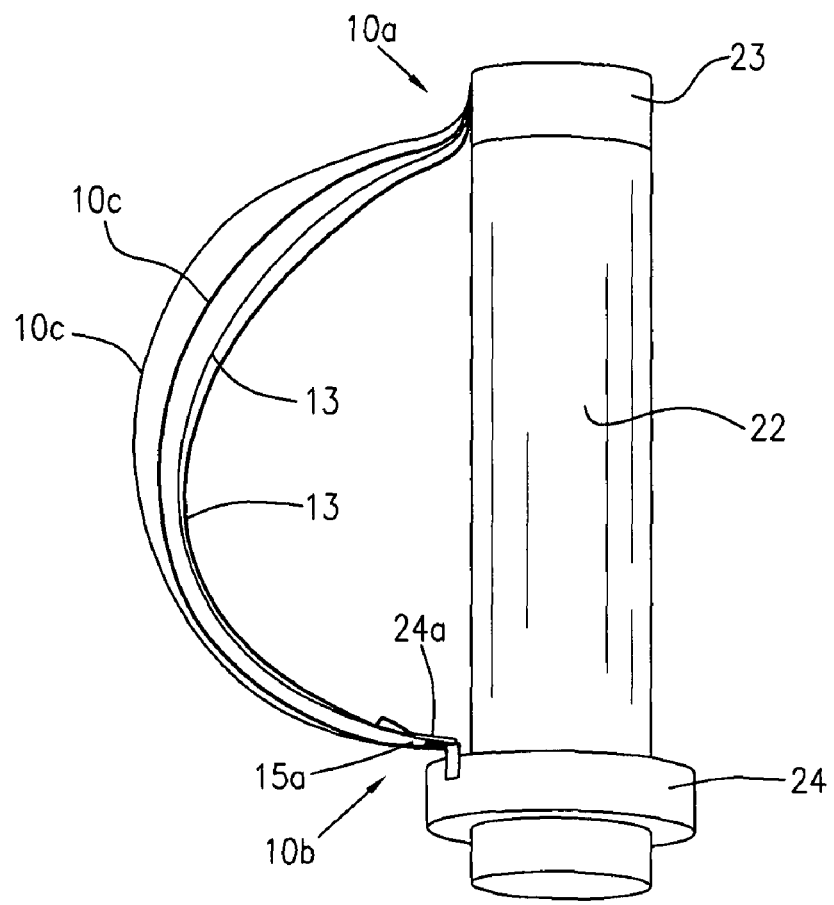
FIG. 8 is a schematic side view of one of the blades of the vertical wind turbine showing how the blade twists to increase the blade area presented to the wind.

FIG. 8 is a schematic side view showing one of the plurality of blades 10 attached to shaft 22. Bottom endpiece 15a is connected to lower attachment means 24 to fixedly hold endpiece 15a to prevent the twisting of blade 10 from second end 10b. In one embodiment, endpiece 15a is connected to receiver 24a on lower attachment means 24 using a plurality of nut and bolt assemblies. In a more preferred embodiment, the plurality of nut and bolt assemblies comprises four such assemblies. FIG. 8 again demonstrates how blade 10 twists to increase the blade area (inner surface 13) presented to the wind.

The twisting function provides a distinct advantage over vertical wind turbines of the prior art in that turbine 20 is able to move from the Savonius mode to the Darrieus mode of operation. A Savonius turbine is a drag-type, low torque turbine that is self-starting, but due to its low RPM produces little power for transmission or storage. An example of a Savonius turbine is an anemometer having cup-shaped blades used to measure wind speed. The Darrieus turbine has an efficient power production capability but due to a low starting torque, normally requires an external power source to start the turbine rotation. Because of the amount of lift provided in the Savonius mode by the novel blades 10 of the present invention, turbine 20 is a self-starting turbine, meaning it does not require a motor or supplemental Savonius turbine to initiate rotation. After rotation reaches a threshold level of RPMs, the centrifugal force of rotating turbine 20 causes blades 10 to twist open as described above. This places turbine 20 in the Darrieus mode—the high efficiency, power producing mode. Therefore, the novel design of blades 10 together with the twisting motion caused by the centrifugal force on blades 10 creates a novel self-starting vertical wind turbine system capable of producing significant quantities of power. In addition, as mentioned above, in the Darrieus mode, the open blade position and the blade 10 cross section configuration, smoothes the torque ripple and resulting stress caused by the normally opposing drag and lift points in the circumference of the spinning turbine 20 thereby reducing structural stress on the entire system. The threshold wind velocity depends on the inertia of turbine 20.

Figure 11:
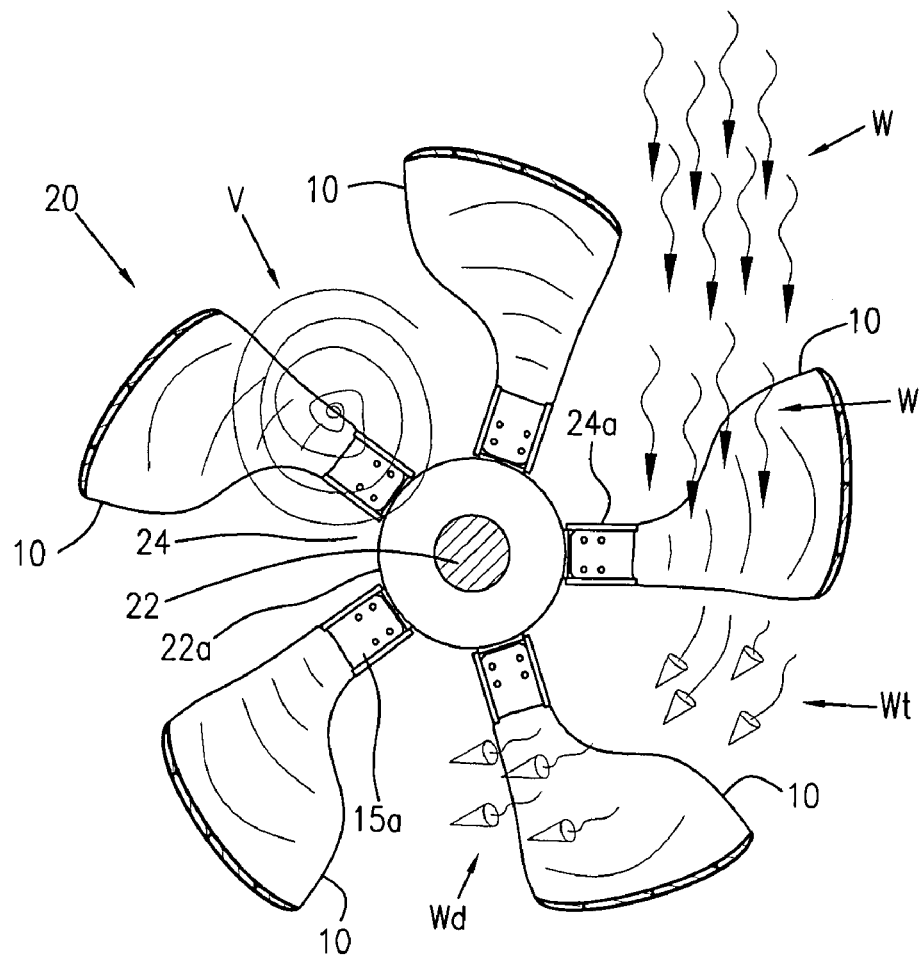
FIG. 11 is a schematic plan view of the turbine of the present invention showing the magnus effect on wind entering the turbine.

In a preferred embodiment, the diameter of shaft 22 is approximately at least 20-30% of the diameter of turbine 20. When shaft 22 is this size, a "magnus" effect is created in which the wind entering turbine 20 is directed around the inside of turbine 20 rather than passing straight through the blades. FIG. 11 (described below) shows how the wind curves around shaft 22 as opposed to passing straight through the turbine. This redirection of the wind provides approximately a 30% increase in efficiency of the power output of the turbine by providing more rotational force to blades 10 as they are actively pushed by the air stream for a greater distance around the arc traversed by turbine 20.

Figure 9:
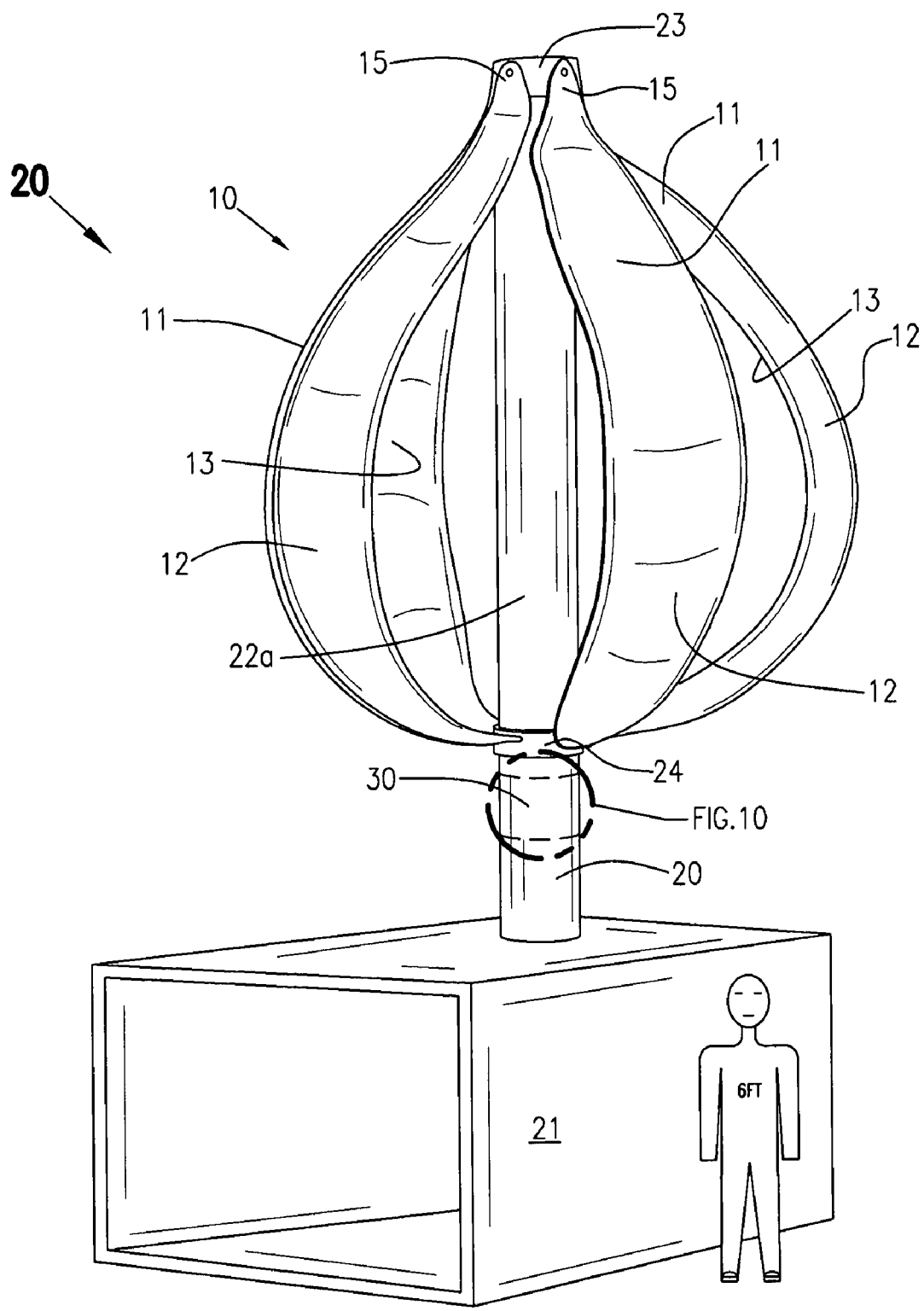
FIG. 9 is a side perspective view of the vertical wind turbine depicting the incorporation of a shaft motor with the shaft.
Figure 10:
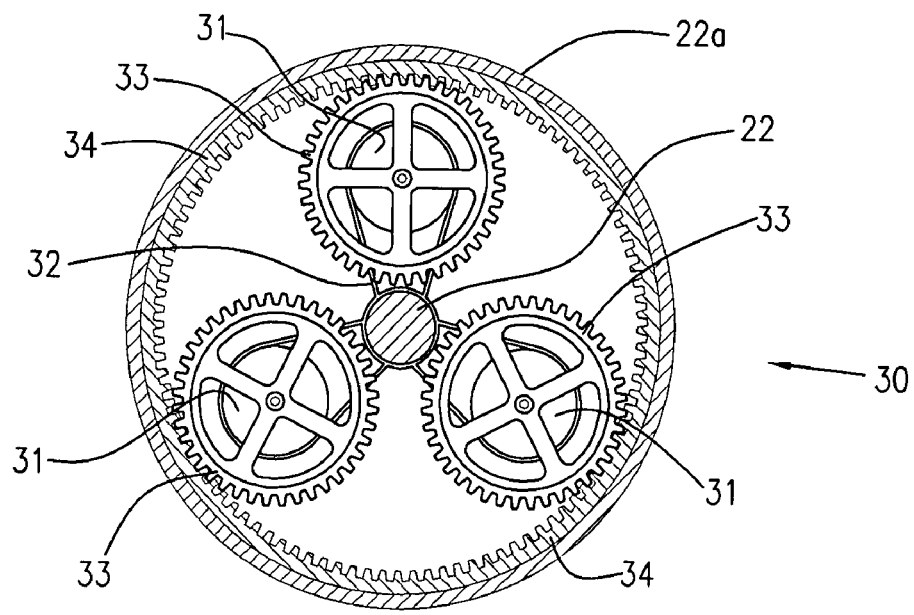
FIG. 10 is a plan view of the shaft motor showing how it is arranged to provide rotation to the shaft.

In this regard, FIG. 9 is a side perspective view of turbine 20 depicting an alternate embodiment in which shaft motor assembly 30 ("motor assembly 30") is integrated with shaft 22 to provide rotation to magnus shaft 22a which is positioned around shaft 22. In one embodiment, upper attachment means 22 and lower attachment means 24 are rotatably attached to magnus shaft 22a. In an alternate embodiment, upper attachment means 22 and lowered attachment means 24 are attached to shaft 22 above and below, respectively, magnus shaft 22a and magnus shaft 22a rotates separately from shaft 22. In this embodiment, magnus shaft 22a is in the form of an outer shell around shaft 22. The diameter of the outer shell is at lest 20% of the diameter of turbine 20. FIG. 10 is a plan view of motor assembly 30 showing how it is arranged to provide rotation to magnus shaft 22a. A plurality of magnus motors 31 are strapped to shaft 22 by straps(s) 32 and rotate with shaft 22. As turbine 20 starts to rotate, it carries motors 31 in rotation with planetary gears 33 freewheeling within ring gear 34. Generator controller 44, which preferably incorporates a computer, programmable logic unit or other microcontroller, receives data concerning wind speed and other relevant parameters and sends signals to provide power to motors 31. Motors 31 apply torque through planetary gears 33 to ring gear 34 and magnus shaft 22a begins to rotate and increase its rotational speed (RPM). As RPMs increase in magnus shaft 22a, the magnus effect is enhanced thereby increasing the torque and rotational speed of turbine 20. Controller 44 measures power produced by turbine 20 versus the power required to drive motors 31 and adjusts motor 31 speed to achieve the highest power input or storage with the lowest power consumption. Persons of skill in the art will recognize that other configurations of motor assembly 30 may be used to rotate shaft 22a.

FIG. 11 is a plan view of a cross section of turbine 20 depicting how the air flow into turbine 20 is altered by the magnus effect of magnus shaft 22a. Wind enters the turbine on a path W represented by the solid arrows. This path is on a particular plane as it enters the turbine. Shaft 22a causes the wind path to turn from path W to path Wt. As it continues through the turn, the air stream within turbine 20 may also drop from the original plane to a lower plane signified by arrows Wd depending if and how fast the magnus post is rotating.

This increase in efficiency provided by the magnus effect in both the stationary and motorized shafts 22a is produced by the increase in lift and decrease in drag created during the rotation of turbine 20. As turbine 20 rotates, there is a point in the circumference of rotating turbine 20 where maximum lift is produced which provides the maximum motive force to rotate the turbine. Opposite the point of maximum lift is a point of maximum drag where blades 10 turn into the wind path to slow turbine 20. This drag causes the ripple effect often seen in the rotation of vertical axis turbines. The magnus effect, whether produced by a stationary shaft 22 or a motorized magnus shaft 22a, provides additional motive force to create more torque to enable turbine 20 to more easily overcome the drag that is on the turbine. Consequently, more torque from the rotation of turbine 20 is applied to the generation of power rather than to maintaining rotation of the turbine itself and a smoother rotation is achieved with reduced structural stress on the system.

Figure 12:
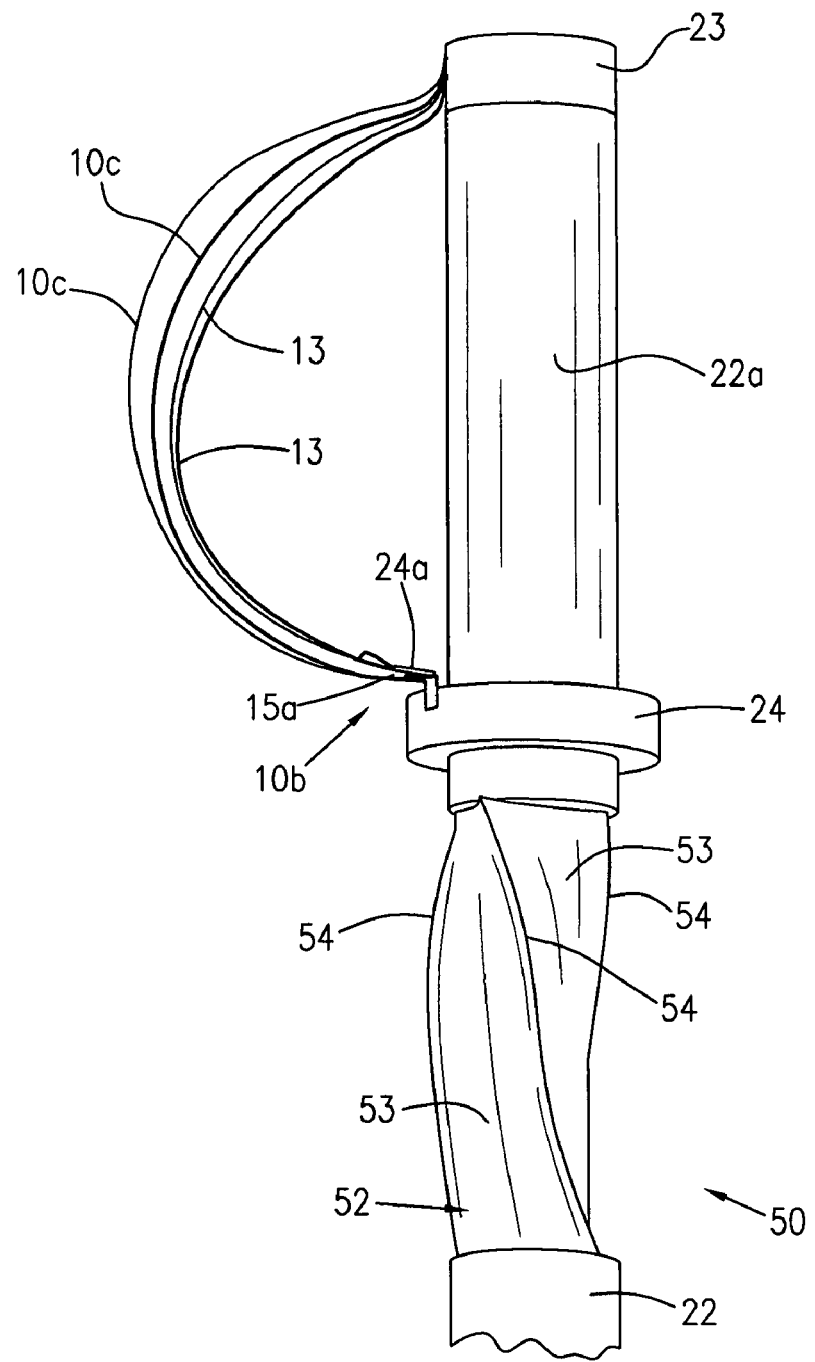
FIG. 12 is a side view of an alternate embodiment of the present invention showing a modified shaft.
Figure 13:
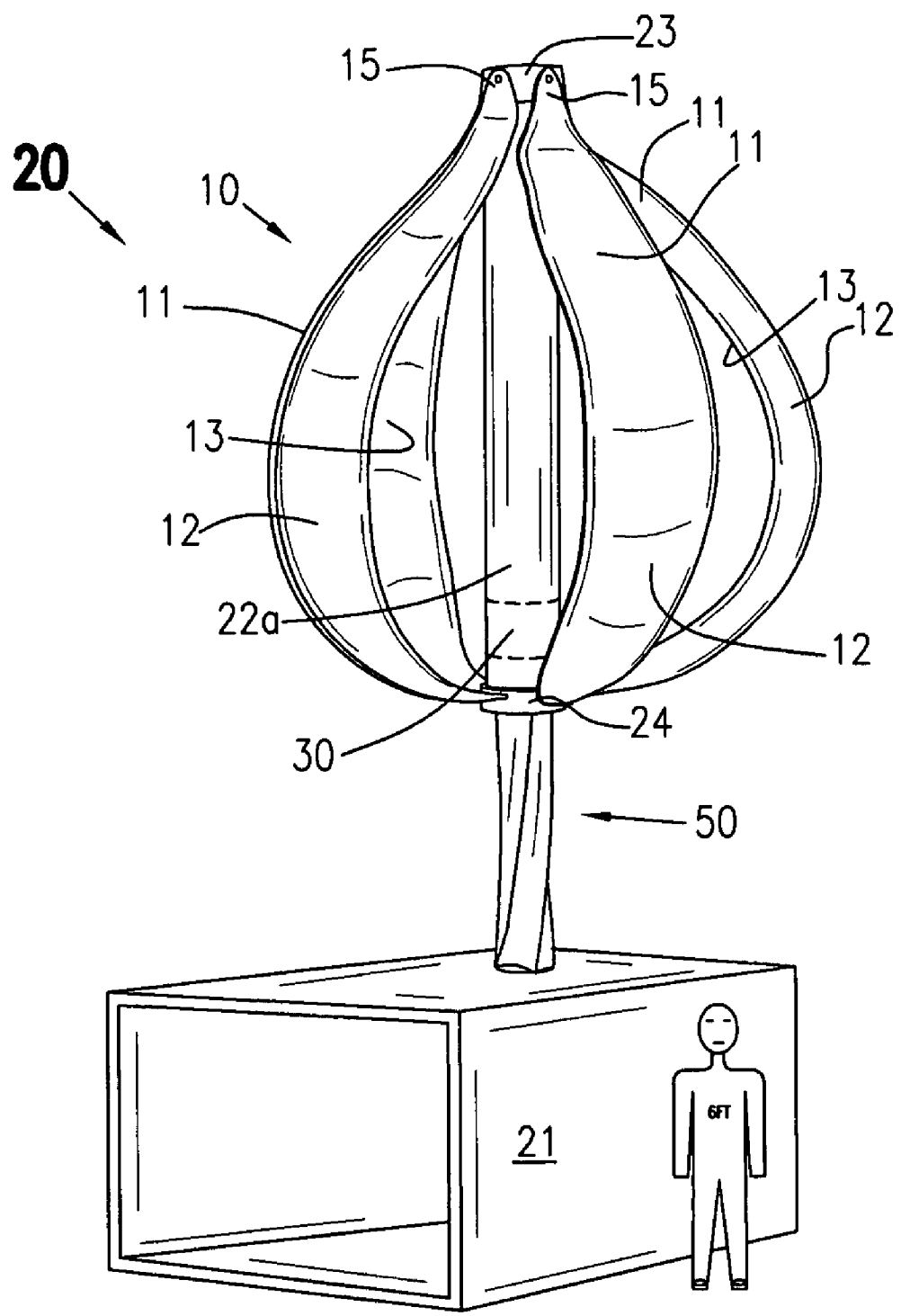
FIG. 13 is a side perspective view of the vertical wind turbine depicting the incorporation of a the modified shaft with a motorized the magnus shaft; and, FIG. 14 is a schematic drawing of the turbine of the present invention incorporated into an electrical storage and distribution system.

FIG. 12 also shows an embodiment in which at least part 50 of shaft 22 that extends below turbine 20 is modified to include a plurality of facings 52 each having a central depression 53 and higher helical edges 54. In a preferred embodiment, the shaft portion 50 has three facings 52. Central depression 53 extends longitudinally and helically along the modified portion of shaft 22. FIG. 13 shows turbine 20 in which shaft modification 50 is incorporated with a system with motorized magnus shaft 22a.

Alternately, a shaft extension may extend above turbine 20. The shaft extension may include a plurality of facings each having a central depression and higher helical edges. The shaft extension may three such facings. In a different embodiment, both the shaft extension and modified portion 50a of shaft 22 below turbine 20 may be incorporated into one rotating shaft 22. In a different alternate embodiment, the grooved shaft may extend through inside turbine 20. Upper attachment means 22 may be configured to fit into the modified shaft to thus move up or down the shaft blades 10 are twisted and expanded out when moving into the Darrieus mode.

Modified shaft portion 50 acts as a High Rpm Low Torque turbine and acts to help start turbine 20. Shaft modification 50 rotate at the same speed as turbine 20 and act as Savonius turbines that reduce the time needed to place turbine 20 into the Darrieus mode. The Savonius effect is present and continuous even under the Darrieus mode operation of turbine 20 and acts to even out the distribution of wind energy within turbine 20. Normally in the Darrieus mode, the rotational forces are comparatively narrow compared to the entire inner surface of turbine 20. The presence of the continuous Savonius effect more evenly distributes the narrow Darrieus forces. FIG. 13 is a side perspective view of turbine 20 and shows magnus shaft 50 in use with turbine 20. In an alternate embodiment, turbine 20 includes shaft extension 50, modified shaft portion 50a, and a magnus shaft 22a in the same system with magnus shaft 22a either comprising a shaft 22 that is at least 20% of the diameter of turbine 20 or an outer shell 22a that surrounds shaft 22. In a second alternate embodiment, outer shell 22a is motorized.

Figure 14:
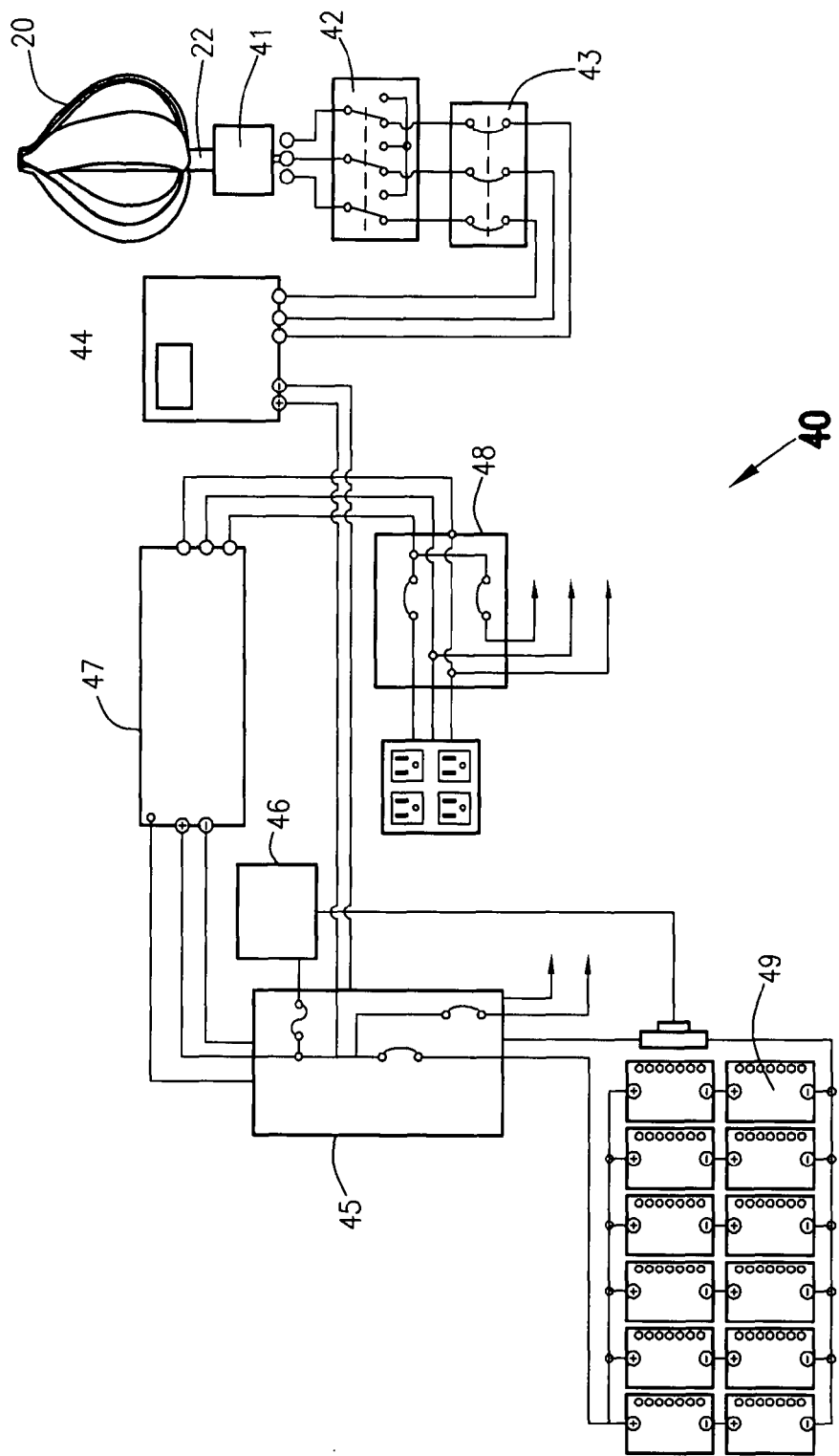

FIG. 14 is a schematic drawing showing the incorporation of turbine system 20 into energy distribution and storage system 40. Shaft 22 (or magnus shaft 22a) of turbine 20 is operatively connected to generator 41. By operatively connected is meant that shafts 22 or 22a act to turn the rotor of generator 41 either directly or indirectly through a gearing system (not shown). The electricity (power) generated by generator 41 is transmitted through brake switch 42 (which can stop turbine 20 from rotating) and breakers 43 to controller 44. Controller 44 is a programmable logic unit connected to sensors that record wind velocity, amperage, power output, power input, and other parameters to control the operational parameters of system 40 and to stop turbine 20, if necessary. Power then passes to breaker system 45, AC amp meter 46, and inverter 47 which converts the DC current generated by turbine 20 to AC current for use in a household or other setting. Power may also be diverted to batteries 48 for storage and later use. It will be obvious to those skilled in the art that other electrical generations systems may be coupled to the system 40 such as solar panels, gas powered generators, and an electrical grid. A connection to an electrical grid enables the transmission of power to the grid by system 40 if excess (unused) power is generated by turbine 20.

Thus it is seen that the objects of the invention are efficiently obtained, although changes and modifications to the invention should be readily apparent to those having ordinary skill in the art, which changes would not depart from the spirit and scope of the invention as claimed.

PARTS LIST

10 Blade
11 outer skin
12 blade body
13 inner facing
14 foam and fiberglass core
15 upper endpiece
15a lower endpiece
20 vertical wind turbine
21 base
22 shaft
22a magnus shaft
23 upper attachment means
24 lower attachment means
30 shaft motor assembly
31 magnus motor
32 drive belt
33 planetary gear
34 ring gear
40 energy storage and distribution system
41 generator
42 brake switch
43 breakers
44 controller
45 breaker system
46 AC amp meter
47 inverter
48 batteries
50 shaft extension
52 facing
53 depression
54 helical edge
50a modified shaft portion
52a facing
53a depression
54a helical edge

We claim:

1. A wind turbine system comprising:
   a base, said base standing in a substantially vertical orientation in relation to a foundation or ground and having a bottom end and a top end;
   a rotating shaft extending from said top end of said base in a substantially vertical orientation;
   a lower shaft attachment means attached to said shaft;
   an upper shaft attachment means attached to said shaft above said lower attachment means;
   a turbine comprising a plurality of blades, each of said blades formed from a curved 27-2012 airfoil and having a first end fabricated from a rubber or elastomer and attached to said upper shaft attachment means and a second end fabricated from elastomer or rubber and attached to said lower shaft attachment means, wherein each of said first ends is attached to said upper shaft attachment means by a swivel connection and each of said second ends is fixedly attached to said lower shaft attachment means using a plurality of bolts;
   wherein said second end is curved toward said first end to form a peak wherein the length of said airfoil from said peak to said second end is less than the length of said airfoil from said peak to said first end; and,
   wherein the angle between said peak and said second end is more acute than the angle between said peak and said first end; and, wherein each of said vanes twists on said swivel connection when rotating at a velocity above a first threshold velocity.

2. The wind turbine system as recited in claim 1 further comprising an outer shell surrounding said shaft and extending at least between said upper attachment means and said lower attachment means.

3. The wind turbine system as recited in claim 2 wherein said outer shell possesses a diameter at least 20 percent of the diameter of said turbine.

4. The wind turbine system as recited in claim 2, wherein said outer shell is rotated using at least one motor.

5. The wind turbine system as recited in claim 1 wherein at least part of the outer surface of said rotating shaft extending below said turbine includes a plurality of facings.

6. The wind turbine system as recited in claim 5, where each of said plurality of facings has a central depression and helical-shaped edges wherein said central depression and said helical-shaped edges extend the longitudinal length of said facing.

7. The wind turbine system as recited in claim 5 wherein said plurality of facings comprises three facings.

8. The wind turbine system as recited in claim 1 wherein said shaft possesses a diameter at least 20 percent of the diameter of said turbine.

9. The wind turbine system as recited in claim 1 wherein said lower attachment is a hub surrounding said shaft and comprises a plurality of receivers to receive said second end of one of said plurality of said blades, each of said receivers including a plurality of nut and bolt assemblies to attach said second end to said receiver.

10. The wind turbine system as recited in claim 9 wherein each of said plurality of nut and bolt assemblies comprises four nut and bolt assemblies.

11. The wind turbine system as recited in claim 1 wherein said upper assembly is a hub having a plurality of receivers to receive said first end of one of said blades, said receiver including said swivel connection.

12. The wind turbine system as recited in claim 1 wherein said swivel connection comprises a bolt and a castle nut.

13. The wind turbine system as recited in claim 1 wherein at least one of said blades is fabricated from a composite material.

14. The wind turbine system as recited in claim 1 wherein at least one of said blades is fabricated from metal.

15. The wind turbine system as recited in claim 1 wherein at least one of said blades is fabricated from wood.

16. The wind turbine system as recited in claim 1 wherein said plurality of blades comprises an odd number of blades.

17. The wind turbine system as recited in claim 16 wherein said plurality of blades comprises five blades.

18. The wind turbine system as recited in claim 1 further comprising a generator, said generator operatively attached to said rotating shaft.

19. The wind turbine system as recited in claim 1 wherein said base is a tower.

20. A wind turbine system comprising:
a base, said base standing in a substantially vertical orientation in relation to a foundation or ground and having a bottom end and a top end;
a rotating shaft extending from said top end of said base in a substantially vertical orientation;
an extension of said rotating shaft, wherein said extension extends above said turbine and includes a plurality of facings on the outer surface of said extension, each of said plurality of facings having a central depression and helical-shaped edges wherein said central depression and said helical-shaped edges extend the longitudinal length of said facing;
a lower shaft attachment means attached to said shaft;
an upper shaft attachment means attached to said shaft above said lower attachment means;
a turbine comprising a plurality of blades, each of said blades formed from a curved 27-2012 airfoil and having a first end fabricated from a rubber or elastomer and attached to said upper shaft attachment means and a second end fabricated from elastomer or rubber and attached to said lower shaft attachment means, wherein each of said first ends is attached to said upper shaft attachment means by a swivel connection and each of said second ends is fixedly attached to said lower shaft attachment means using a plurality of bolts;
wherein said second end is curved toward said first end to form a peak wherein the length of said airfoil from said peak to said second end is less than the length of said airfoil from said peak to said first end;
wherein the angle between said peak and said second end is more acute than the angle between said peak and said first end;
wherein each of said vanes twists on said swivel connection when rotating at a velocity above a first threshold velocity; and,
wherein said rotating shaft includes a modified portion, said modified portion extending below said turbine and including a plurality of facings has a central depression and helical-shaped edges wherein said central depression and said helical-shaped edges extend the longitudinal length of said facing.

21. A modified 27-2012 airfoil comprising:
a tapered first end having an endpiece, said end piece being flexible to allow twisting of said airfoil; and,
a tapered second end, said tapered second end having an endpiece;
wherein said second end is curved toward said first end to form a peak, and;
wherein the length from said peak to said second end is less than the length from said peak to said first end; and,
wherein an angle between said peak and said second end is more acute than an angle between said peak and said first end;
wherein said airfoil is a composite comprising:
an outer skin fabricated from a fabric material; and,
an inner core fabricated from a combination of foam and fiberglass material.

22. The flexible blade for a vertical axis wind turbine as recited in claim 21 wherein said composite is vacuum injection molded.

23. The flexible blade for a vertical axis wind turbine as recited in claim 21 wherein said fabric material is KEVLAR®.

24. The flexible blade for a vertical axis wind turbine as recited in claim 21 wherein said fabric material is formed from carbon graphite.

25. The flexible blade for a vertical axis wind turbine as recited in claim 21 wherein said first end of said flexible blade includes a rubber or elastomer.

26. The flexible blade for a vertical axis wind turbine as recited in claim 21 wherein said foam is polyurethane.

27. The flexible blade for a vertical axis wind turbine as recited in claim 21 wherein said fiberglass is formed from vinyl ester.

* * * * *